Nov. 4, 1969   R. G. MASSEY   3,476,226
OVERRUNNING CLUTCH WITH CONTROLLED OPERATION
Filed Sept. 12, 1966   2 Sheets-Sheet 1
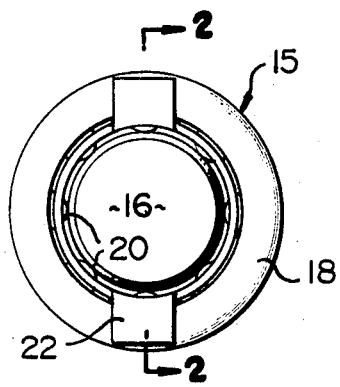
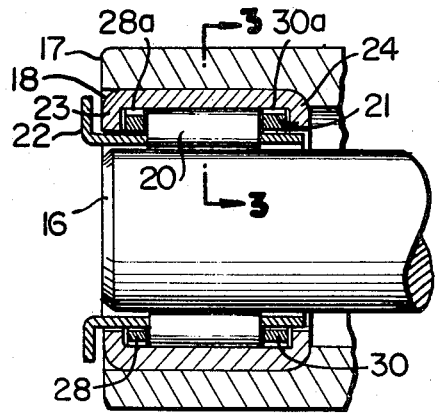
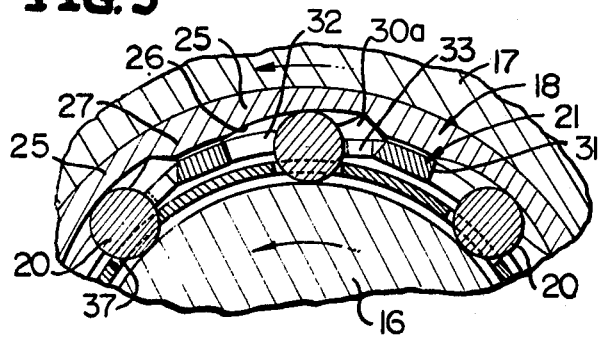
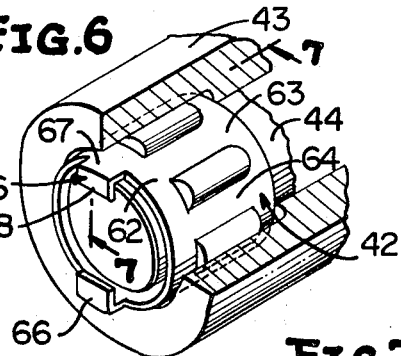
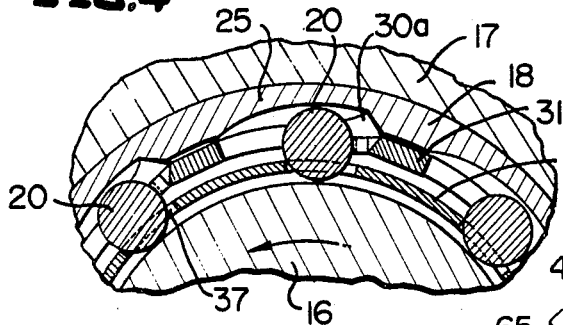
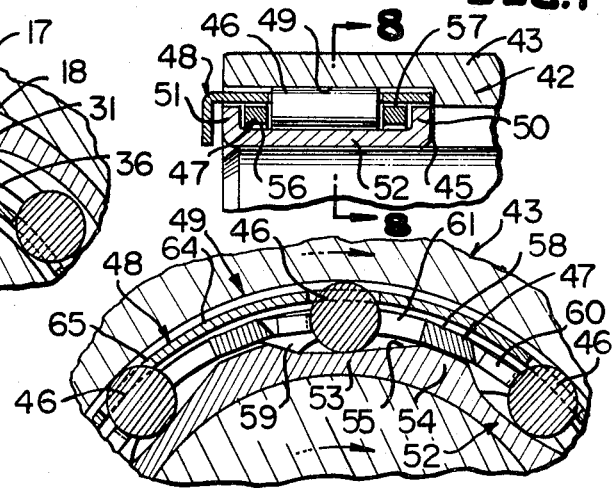
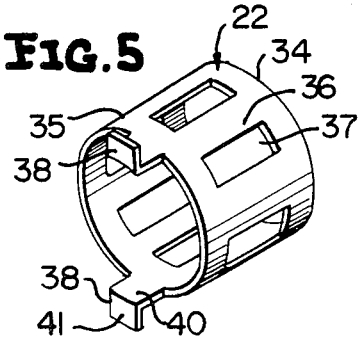
INVENTOR
ROGER G. MASSEY
BY
ATTORNEYS Nov. 4, 1969   R. G. MASSEY   3,476,226
OVERRUNNING CLUTCH WITH CONTROLLED OPERATION
Filed Sept. 12, 1966   2 Sheets-Sheet 2
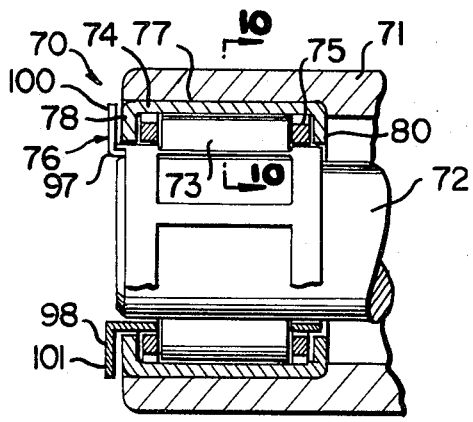
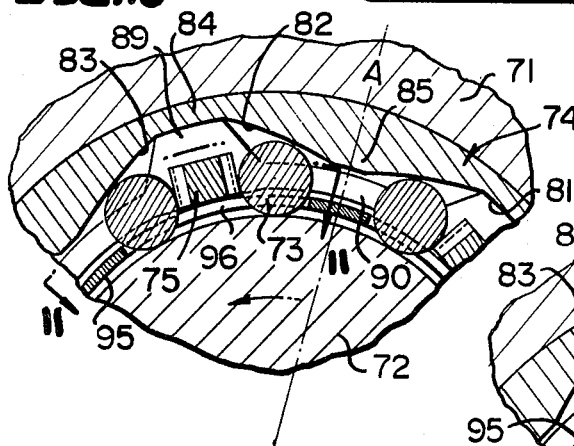
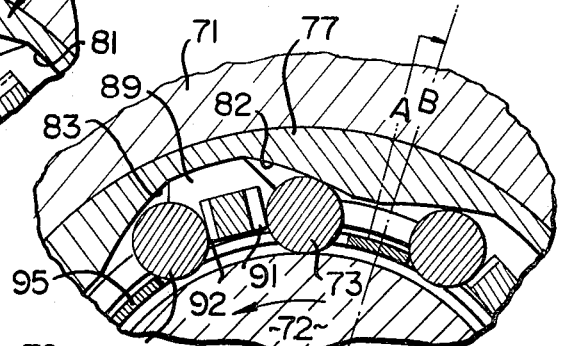
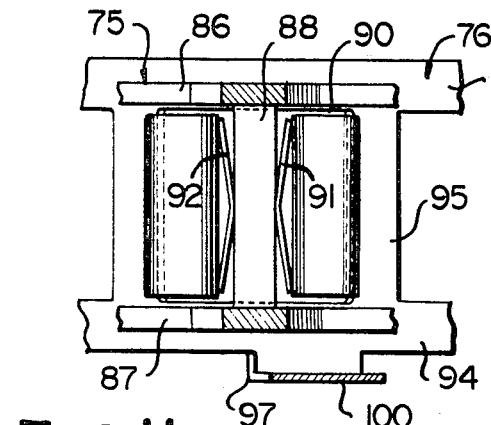
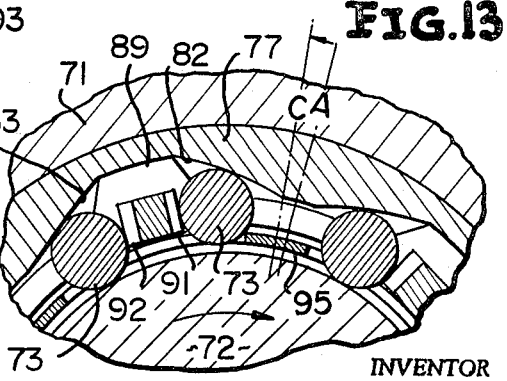
INVENTOR
ROGER G. MASSEY
BY
ATTORNEYS United States Patent Office 3,476,226
Patented Nov. 4, 1969

3,476,226
OVERRUNNING CLUTCH WITH CONTROLLED
OPERATION
Roger G. Massey, Litchfield, Conn., assignor to The
Torrington Company, Torrington, Conn., a corporation of Maine
Filed Sept. 12, 1966, Ser. No. 578,633
Int. Cl. F16d 15/00, 11/06, 67/02
U.S. Cl. 192—27                                              27 Claims

ABSTRACT OF THE DISCLOSURE

There is disclosed overrunning clutch means with controlled operation including in combination a first cylindrical circumferential member, a second cylindrical circumferential member, clutching rollers disposed between the members, cylindrical retaining means for the rollers and having windows therein each defined by parallel bars to receive one such roller, biasing means carried by and projecting from certain bars for engagement with the rollers, clutching surface means on one of the members, separating means for contacting engagement with the rollers and for forcing the rollers away from the clutching surface means against the force of the biasing means upon a predetermined rotatable displacement of the separating means, and control means for actuating the separating means.

---

This application relates in general to clutch mechanisms, and in partciular to mechanisms for controlling the operation of clutches, specifically overrunning clutches.

Prior art clutch devices are not generally adapted to be readily actuated from a position externally of the devices, and to be readily responsive to such external actuation. Additionally, prior art clutch devices are not adapted to automatically guard against an overrunning of the driven clutch member, as for instance, when the driven clutch member exceeds the speed of the driving clutch member. Thus these devices are deficient in providing an automatically actuated additional clutching mechanism within the clutch, responsive to an overrunning of the driven member. Prior art devices are also deficient, in that, while a clutching device may be actuated to prevent additional driving force to the drive member, by a disengagement of the driving member from the driven member, these devices are not adapted to stop the driven member from coasting to a stop. Thus, positive and accurate indexing, often desirable in clutch devices, is not possible without some means other than the clutch and a releasing mechanism.

Accordingly, the present invention seeks to provide a clutch design which can be made to overrun or release in either direction, as desired.

The device of this invention also seeks to provide a means of positively releasing the driving member from the driven member, as well as for positively stopping the rotation of the driven member.

Even further, the present invention seeks to provide a clutch device such that, should the driven member tend to speed up during some phase of the rotation cycle, the clutch will automatically lock the driven member to the driving member, and thus prevent the output from overrunning the input.

Accordingly, it is a primary object of this invention to provide a releasing separator element, for use with a clutch device, which may readily be constructed from materials such as sheet metal, into a cylindrical configuration, and which has engagement tabs extending outwardly from the clutch device, for actuation, as desired.

It is another object of this invention to provide a novel clutch assembly comprising driving elements and at least one driven member, adapted for use with a driving member, and a releasing separator adapted to be rotatably movable from a position external to the clutch device, for engaging and disengaging the clutching elements with the driven member.

It is still another object of this invention to provide a clutch assembly having a plurality of driving elements for driving a driven member, in response to rotation of a driving member, and to provide a retainer for spring-biasing the clutching elements into a position of engagement with the driven member, wherein a releasing separator device is also provided to be rotatably movable for actuating the disengagement of the clutching elements with the driven member.

It is a further object of this invention to provide a clutch assembly having driving elements and a driven member, a retainer disposed about the driving elements for a predetermined displacement of the elements, and a releasing separator disposed in spaced radial relation to the retainer, and adapted to facilitate disengagement of the clutching elements upon rotatable displacement of the separator.

It is a further object to provide a clutch assembly as set forth above, which is adapted for use with various clutching elements, such as rollers, balls and sprags.

It is another object of this invention to provide a novel clutch assembly comprising driving elements, a driven member having element-engaging ramps thereon, a retainer for spring-biasing the elements into engagement with the ramps, and a releasing separator for facilitating disengagement of the elements from the ramps.

It is a further object of this invention to provide a novel clutch assembly having driving elements and a driven member, some of the elements being operable upon being driven by a driving member to rotate the driven member in the same direction as the driving member, and other of the elements being operable upon an overrunning of the driven member with respect to the driving member, to engage a clutching surface of the driven member and thereby prevent the overrunning.

It is a further object of this invention to provide a clutch assembly as set forth above, wherein releasing separator means are provided for actuation externally of the assembly, for moving the driving elements out of engaged positions on the driven member, and thereby permitting an overrunning of the driven member.

With the above and other objects in view that will hereinafter appear, the nature of the invention will be more clearly understood by reference to the following detailed description, the appended claims and the several views illustrated in the accompanying drawings.

In the drawings:

FIGURE 1 is an end elevational view of the clutch assembly of this invention, mounted on a shaft, and illustrates an end view of tabs extending outwardly from a releasing separator of this invention.

FIGURE 2 is a fragmentary elevational sectional view taken along the line 2—2 of the clutch assembly of FIGURE 1, and illustrates a clutch assembly disposed within a housing and mounted on a shaft.

FIGURE 3 is an enlarged fragmentary sectional view of the clutch assembly of this invention, taken along the line 3—3 of FIGURE 2, and wherein there is illustrated the relative dispositions of the retainer and releasing separator of this invention, in combination with driving elements and a driven member, the releasing separator being illustrated in its normal position during the driving of a driven member through the driving elements by a shaft.

FIGURE 4 is an enlarged fragmentary sectional view similar to that of FIGURE 3, but wherein the releasing separator and driving elements are illustrated as being displaced somewhat in a clockwise direction with respect to driven member and retainer, whereby there is no transmission of motion from the driving shaft to the driven member.

FIGURE 5 is a top perspective view of a releasing separator of this invention, wherein there is illustrated engagement tabs extending axially of the cylindrical separator and bent radially outwardly thereof.

FIGURE 6 is a fragmentary perspective view of the clutch assembly of this invention disposed about a shaft and within a housing, with portions broken away for clarity, and wherein the engagement tabs of the releasing separator are bent radially inwardly, and illustrating a modification of the clutch assembly of this invention, wherein the driven member is disposed radially inwardly of the driving elements.

FIGURE 7 is a fragmentary elevational sectional view of the clutch assembly of this invention taken along the line 7—7 of FIGURE 6.

FIGURE 8 is an enlarged fragmentary sectional view of the clutch assembly of this invention illustrated in FIGURE 6, with the releasing separator and driving elements being illustrated in their normal position during the driving of the driven member.

FIGURE 9 is a fragmentary elevational sectional view of a modified form of the clutch assembly of this invention, disposed about a driving shaft and inwardly of a driven member.

FIGURE 10 is an enlarged fragmentary sectional view of the clutch assembly illustrated in FIGURE 9, taken along the line 10—10 of FIGURE 9, wherein the releasing separator and driving elements are illustrated in their normal position during the driving of a driven member through the driving elements by the shaft.

FIGURE 11 is a fragmentary sectional view of the modified form of the clutch assembly illustrated in FIGURE 9, taken along the line 11—11 of FIGURE 10, and wherein there is illustrated springs on opposite sides of a cross-bar of a retainer in engagement with roller-type driving elements in the assembly.

FIGURE 12 is an enlarged fragmentary sectional view of the modified form of clutch assembly illustrated in in FIGURE 9, taken along a line similar to that of 10—10 of FIGURE 9, and wherein the releasing separator and driving elements are illustrated in a non-driving position, having been displaced in a clockwise direction relative to the driven member and retainer somewhat from their positions illustrated in FIGURE 10.

FIGURE 13 is an enlarged fragmentary sectional view of the modified form of the clutch assembly illustrated FIGURE 9, taken along a line similar to that of 10—10 of FIGURE 9, wherein there is illustrated the releasing separator and driving elements having been displaced somewhat in a counterclockwise direction relative to driven member and retainer from their positions as illustrated in FIGURE 10, and in which positions the driving elements are not operative to drive the driven member with the shaft.

Referring now to the drawings in detail, reference is first made to FIGURE 1 wherein there is illustrated a clutch assembly 15 mounted on a shaft 16. The clutch assembly 15 is disposed within a housing 17 and includes an outer circumferential cylindrical driven member 18, a plurality of driving elements 20 of the roller type, a retainer 21 and a releasing separator 22.

The circumferential driven member 18 is of the cylindrical type, having inwardly bent ends 23, 24, a plurality of arcuate ramps 25 having ramp surfaces 26 and thickened wall portions 27 disposed between adjacent ramps. The member 18 may be machined, or may be of the drawn cup type as is desired.

The retainer 21 includes ring-like end portions 28, 30 connected by spaced bars 31, defining windows 32 therebetween. End portions 28, 30 have a plurality of radially projecting teeth 28a and 30a on the periphery engaging thickened portions 27 and ramp surfaces 26 to register retainer 21 with driven member 18. Spring-type biasing means 33 extend from the left side of each of the bars 31, for engaging contact with an associated driving element 20.

The releasing separator 22, best illustrated in FIGURE 5, includes spaced ring-like end portions 34, 35 with connecting longitudinally disposed bars 36 therebetween, defining windows 37 between adjacent bars. A pair of engagement tabs 38 are provided, integral with the releasing separator, at one end thereof, and oppositely disposed across the diameter of the separator 22. Each tab 38 includes an axially extending portion 40 and a radially outwardly bent portion 41. The releasing separator 22 may be drawn and stamped from sheet metal, or may be constructed by any other suitable method.

The driving or clutching elements 20 are equidistantly disposed within the cylindrical member 18, each on an associated ramp surface 26, within an associated window 32 of the retainer 21, and within an associated window 37 of the releasing separator 22. The bars 31 of the retainer 21 are each disposed radially inwardly of and adjacent a thickened portion 27 of the cylindrical member 18, each with an associated spring portion 33 in engagement with a driving element 20, for urging the element 20 upwardly of an associated ramp surface 26 (to the left as viewed in FIGURE 3). The cylindrical member 18 may be pressed into the housing 17, or otherwise attached thereto.

Referring now to the modified form of clutch assembly 42 illustrated in FIGURE 6, the assembly 42 is shown disposed within an outer driving cylindrical member 43 and mounted on a driven shaft 44, as by press-fitting. The assembly 42 includes a cylindrical driven member 45, roller-type clutching elements 46, a retainer 47 and a releasing separator 48.

The driven cylindrical member 45 has radially outwardly bent end portions 50, 51 and a central cylindrical portion 52. The portion 52 has ramp portions 53 located between thickened portions 54 disposed about the radial outer surface of cylindrical portion 52. The ramp portions 53 have ramp surfaces 55.

The retainer 47 includes ring-like end portions 56, 57 and connecting bars 58. The end portions 56, 57 have radially inwardly projecting registering teeth 59. Each of the bars 58 has spring-like biasing means 60 extending from one side thereof (to the right of each bar 58 as viewed in FIGURE 8), for contacting engagement with an associated element 46, positioned in an associated window 61 between adjacent bars 58.

The releasing separator 48 comprises ring-like end portions 62, 63, connected by spaced bars 64, defining windows 65 between adjacent bars 64. A pair of tabs 66 extend from one end 62 of the separator 48 and have axially extending portions 67 and radially inwardly extending portions 68. The tabs 66 are disposed diametrically opposite each other at the end 62 of the separator 48.

The rollers 46 are each disposed on an associated ramp surface 55 between adjacent thickened portions 54 of the cylindrical member 52. The retainer 47 and releasing separator 48 are disposed about the cylindrical member 52, with the releasing separator 48 positioned radially outermost thereof. The bars 58 of the retainer 47 are positioned immediately radially outwardly of the thickened portions 54 of the cylindrical member 52. The rollers 46 are positioned within the windows 61 of the retainer and the windows 65 of the releasing separator, with the spring portions 60 of the retainer in contacting engagement with the rollers 46, tending to force the rollers 46 upwardly of the ramps 53, into a wedging engagement between an associated ramp surface 55 and an inner surface 49 of the driving cylindrical member 43.

In FIGURE 9 there is illustrated another modified form of a clutch assembly 70 of this invention, press-fitted into a housing 71, and mounted on a driving shaft 72. The clutch assembly includes driving elements 73, a cylindrical driven cup member 74, a retainer 75 and a releasing separator 76. The driven cylindrical cup member 74 includes a cylindrical wall portion 77 and radially inwardly bent end portions 78, 80. On an inner surface 81 of the cylindrical portion 77 are pairs of opposing ramps 82, 83 extending between thin walled cylindrical portions 84 and thickened cylindrical portions 85. The ramps 82, 83 are mirror images of each other about a point midway across each thin cylindrical portion 84.

The retainer 75 comprises spaced ring-like end portions 86, 87 (FIGURE 11) having equidistantly spaced bars 88 therebetween, defining windows 90 between adjacent bars 88. The rings 86, 87 have teeth 89 interlocking with the member 74 to register the retainer relative thereto. Spring-type biasing means 91, 92 are disposed, one on each side of each bar 88, extending from each side of each bar 88 in circumferentially opposite directions.

The releasing separator 76 includes axially spaced ring-like end portions 93, 94 with equidistantly spaced connecting bars 95 therebetween, defining windows 96 between adjacent bars 95. A pair of actuating tabs 97, 98 extend axially outwardly of and integral with one end of a ring-like end portion 94 of the releasing separator 76, each of the actuating tabs 97, 98 terminating in radially outwardly bent end portions 100, 101.

The driving or clutching elements 73 are assembled in pairs, on opposed ramp portions 82, 83 of the driven cylindrical member 74. The retainer 75 is assembled with each bar 88 thereof between a pair of adjacent elements 73 disposed on opposing ramps 82, 83, with spring portions 91, 92 of each of the bars 88 urging associated driving elements 73 into wedging contact with the associated ramp portions 82, 83, between the driven cylindrical member 74 and the driving shaft 72. Two driving elements or rollers 73 are thus disposed in each window 90 between adjacent bars 88 of the retainer 75.

The releasing separator 76 is disposed positioned just radially inwardly of the retainer 75, with a pair of rollers 73 disposed within each window 96 of the separator 76, on opposite sides of each bar 88 of the retainer 75. The diametrically oppositely spaced tabs 97, 98 protrude outwardly of one end of the clutch assembly, and upon being actuated, facilitate a rotating displacement of the separator 76 with respect to the driven cylindrical member 74, against the force of opposing spring portions of an associated bar 88 of the retainer 75.

OPERATION

Referring now to the clutch assembly illustrated in FIGURES 1 through 4, it is readily seen that the driving shaft 16, rotating in a counter-clockwise direction as viewed for example in FIGURE 3, wedges the elements 20 between the outer surface of the shaft 16 and an associated ramp surface 26 of the outer cylindrical member 18, thereby driving the member 18 and the housing 17, into which member 18 is press-fitted, in a counter-clockwise direction. In this position of the elements 20, the spring portions 33 of the retainer are biasing the elements 20 upwardly of each ramp surface 26, and the windows 37 of the releasing separator 22 are disposed with associated elements 20 approximately placed centrally thereof. If it is desired to stop the rotation of the housing 17 and driven cylindrical member 18, one or both of the tabs 38 extending outwardly of the clutch assembly 15 is actuated, as by the tabs 38 striking a stop or arm external of the clutch assembly for movement of the releasing separator 22 in a clockwise direction relative to the retainer 21 and driven member 18 as viewed in FIGURE 4. Bars 36 of the releasing separator 22 thus contact the left side of the elements 20 as viewed in FIGURE 4, and also move these elements 20 in a clockwise direction relative to the retainer 21 and driven member 18, thereby downwardly of each associated ramp surface 26, to positions where the elements 20 are not wedged between ramp surfaces 26 and the shaft 16, and in which position there is consequently no driving force transmitted between the shaft 16 and the outer cylindrical member 18. In this position of the releasing separator 22, the shaft 16 rotates free of the driving elements 20, and if the tabs 38 are retained in a fixed position the outer cylindrical member 18 and driven housing 17 will also remain in a fixed position, until one or both of the tabs 38 are released for movement in a counterclockwise direction relative to retainer whereby the bars 36 of the releasing separator 22 will again permit the elements 20 to be biased by springs 33 into wedging engagement between the ramp surfaces 26 and the surface of the shaft 16, and member 18 will again be driven in a counter-clockwise direction.

Referring now to the modified form of the clutch assembly 42 illustrated in FIGURES 6 through 8, it is readily seen that the driving cylindrical member 43 is the driving member, in clockwise rotation. The cylindrical member 45 is secured to the shaft 44, as by press-fitting or the like, or may be constructed integral with the shaft 44, for driving the same in a clockwise direction. In the normal position of driving operation illustrated in FIGURE 8, it is seen that the inner circumferential surface 49 of the cylindrical member 43 engages the elements 46 and moves the elements 46 in a clockwise direction, upwardly of the ramp surfaces 55, the elements 46 being also urged upwardly of the ramp surfaces 55 by the spring portions 60 of the bars 58 of the retainer 47, whereby the elements 46 are driven into wedging engagement between the ramp surfaces 55 of the cylindrical member 45 and the inner circumferential surface 49 of the outer cylindrical member 43. In this position the releasing separator 48 is disposed with the windows 65 thereof positioned loosely about associated elements 46, with the bars 64 of the separator 48 approximately equidistantly spaced on each side of each of the elements 46.

Upon striking or other contacting engagement of the actuating tab 66 against a stop, and a consequent rotated displacement of the releasing separator 48 in a counter-clockwise direction with respect to the retainer, the bars 64 of the separator 48 engage associated elements 46 and move the elements 46 downwardly of the ramp surface 55, against the force of spring portion 60 of the retainer 47, and out of wedging engagement between the driven cylindrical member 45 and driving cylindrical member 43. As long as the releasing separator 48 is retained in this position, there will be no drive effected between the members 43 and 45. When it is desired to resume operation of the member 45, the actuating tabs 66 are released, thereby permitting the spring portions 60 on the bars 58 of the retainer 47 to urge the elements 46 up the ramp surfaces 55, into wedging engagement between the ramp surfaces 55 of the cylindrical member 45 and the inner circumferential surface 49 of the driving cylindrical member 43.

Referring now to the modified form of the clutch assembly 70 of this invention illustrated in FIGURES 9 through 13, it is readily seen that the shaft 72 is the driving member, and is illustrated as driving in a counter-clockwise direction as viewed in FIGURE 10, wherein the cylindrical member 74 is illustrated as being the driven member, which in turn drives the housing 71 in a counter-clockwise direction. With continued reference to FIGURE 10, when the shaft 72 is rotating in a counter-clockwise direction, and each of the bars 95 of the separator 76 is disposed symmetrically with a radial center line A, the bars 95 will permit the spring portions 92 to drive the element 73 into wedging engagement between the ramp surfaces 83 of cylindrical driven member 74 and the outer surface of the shaft 72. With this form of the clutch assembly 70, there is automatically prevented a speed-up of the driven member 74, relative to the driving shaft 72. Should for some reason the cylindrical member 74 begin to rotate in a counter-clockwise direction faster than the rotational speed of the shaft 72, the rolling elements 73 disposed on associated ramp surfaces 82, which normally have no drive function when the shaft 72 is rotating in a counter-clockwise direction, are driven into wedging engagement between the ramp surface 82 and outer surface of the shaft 72, thereby retarding the overrunning of the outer cylindrical member 74 with respect to the shaft 72. This rotational retarding effect will continue until the rotational speed of the outer cylindrical member 74 is less than that of the shaft 72, when elements 73 will again drive against ramp surfaces 83.

Upon rotational displacement of the releasing separator 76, such that each of the bars 95 is symmetrically disposed about the radial center line B, to the right of center line A as viewed in FIGURE 12, as by engagement tabs 97, 98 of the releasing separator 76 striking a stop or arm, the elements 73 disposed on ramp surfaces 83 are forced down their associated ramp surfaces 83 by the bars 95 of the separator 76, against the force of spring portions 92 of the retainer 75, and out of wedging engagement between the shaft 72 and ramp surface 83. As long as the releasing separator 76 is retained in this position, the shaft 72 is free to rotate in a counter-clockwise direction as viewed in FIGURE 12, without driving the outer cylindrical member 74 through the element 73. In this position of the releasing separator 76, those elements 73 adjacent ramp surfaces 82 are not in driving engagement, but are forced against spring portions 91 of bars 88 of the retainer 75.

When the shaft 72 is rotated in a clockwise direction, greater rotational speed of the driven cylindrical member 74 with respect to the shaft 72 is prevented in the same manner as above, in that a wedging engagement of elements 73 between ramp surface 83 and the outer surface of the shaft 72 would effect a retardation of any tendency of the outer cylindrical member 74 to rotate faster than the shaft 72, and thus prevent overrunning of the outer cylindrical member 74.

In the normal position of the releasing separator 76 for driving the outer cylindrical member 74 in a clockwise direction, each of the bars 95 of the releasing separator are symmetrically disposed about a radial center line A, as viewed in FIGURE 13, in which position elements 73 are wedgingly engaged between the surface of the shaft 72 and the ramp surface 82 of the outer cylindrical member 74. Upon striking one or both of the tabs 97, 98 striking stops to rotatingly displace the releasing separator 76 in a counter-clockwise direction as viewed in FIGURE 13, each of the bars 95 would be displaced to a position symmetrically disposed about the radial center line C. In this position of the bars 95, the bars would force the elements 73 disposed on ramp surfaces 82, downwardly of the ramp surfaces 82, against the force of a spring portion 91 on the bar 88 of the retainer 75, and out of wedging engagement between the ramp surfaces 82 and the outer surface of the shaft 72. Thus, as long as the releasing separator 76 remains in this position with the bars 95 disposed symmetrically about radial center line C, no driving force would be transmitted through the element 73 against the ramp surface 82 and there would therefore be no driving of the cylindrical member 74. In this position also the element 73 associated with ramp surfaces 83 would merely be forced against spring portions 92 of the bars 88 of the retainer 75.

From the foregoing, it will be seen that novel and advantageous provisions have been made for carrying out the desired end. However, attention is again directed to the fact that additional variations may be made in this invention without departing from the spirit and scope thereof as defined in the appended claims.

I claim:

1. A releasing separator, particularly adapted for use with an overrunning clutch with controlled operation, said separator consisting of a unitary cylindrical member having continuous uninterrupted ring portions at opposite ends thereof, a plurality of spaced bars extending longitudinally of and spaced circumferentially of the cylindrical member between said ring portions and defining windows between each pair of adjacent bars and associated inner edge portions of said ring portions, each said window being dimensioned to permit projection partially therethrough but not passage therethrough of an associated clutching roller, and axially extending tab means connected to one of said ring portions and including a radially disposed circumferentially facing abutment surface, said tab means extending endwise beyond said one ring portion at one end of said cylindrical member for engagement for a purpose of a rotatable displacement of said separator.

2. The separator of claim 1, wherein said tab means comprises at least one tab portion extending longitudinally outwardly of one of said ring portions and then radially inward with relation to the axis of the ring portions.

3. The separator of claim 1, wherein said tab means comprises at least one tab portion extending longitudinally outwardly of one of said ring portions and then radially outward with relation to the axis of the ring portions.

4. A clutch assembly comprising a plurality of spaced clutching rollers in cylindrical disposition, a cylindrical retainer having ring-like end portions and longitudinally extending bars between said end portions, the retainer bars being disposed between a plurality of adjacent ones of said rollers, and a releasing separator spaced radially from said retainer, said separator having ring-like end portions and longitudinally extending bars between said end portions, the separator bars being disposed between a plurality of adjacent ones of said rollers.

5. The assembly of claim 4, wherein each of said retainer bars have a spring portion projecting circumferentially thereof for engagement with at least one adjacent clutching roller, and said separator is rotatably movable relative to said retainer.

6. The assembly of claim 5, wherein a bar of each of said separator and retainer is disposed between each two adjacent clutching rollers.

7. A clutch assembly comprising a plurality of spaced clutching elements in cylindrical disposition, a retainer having at least one ring-like end portion and longitudinally extending bars, the retainer bars being disposed between a plurality of adjacent ones of said elements, and a releasing separator spaced radially from said retainer, said separator having at least one ring-like end portion and longitudinally extending bars, the separator bars being disposed between a plurality of adjacent ones of said elements, each of said retainer bars having a spring portion for engagement with at least one adjacent clutching element, said separator being rotatably movable relative to said retainer, a bar of each of said separator being disposed between two adjacent clutching elements, and wherein said separator is disposed radially inwardly of said retainer.

8. The assembly of claim 6, wherein said separator is disposed radially outwardly of said retainer.

9. The assembly of claim 5, including a cylindrical member disposed in spaced radial relation to said separator having ramp means in contacting relation to said rollers for circumferential travel of said rollers relative to said cylindrical member between said ramp means and an associated spaced circumferential surface.

10. The assembly of claim 9, wherein said spring portions of said retainer bars define means for urging said elements into abutting relation with said ramp means.

11. A clutch assembly comprising a plurality of spaced clutching elements in cylindrical disposition, a retainer having at least one ring-like end portion and longitudinally extending bars, the retainer bars being disposed between a plurality of adjacent ones of said elements, and a releasing separator spaced radially from said retainer, said separator having at least one ring-like end portion and longitudinally extending bars, the separator bars being disposed between a plurality of adjacent ones of said elements, each of said retainer bars having a spring portion for engagement with at least one adjacent clutching element, said separator being rotatably movable relative to said retainer, a bar of each of said separator being disposed between two adjacent clutching elements, there also being included a cylindrical member disposed in spaced relation to said separator having ramp means in contacting relation to said elements for circumferential travel of said elements relative to said cylindrical member between said ramp means and an opposing spaced circumferential surface, said spring portions of said retainer bars defining means for urging said elements into abutting relation with said ramp means, and said cylindrical member being disposed radially outwardly of said elements.

12. The assembly of claim 10, wherein said cylindrical member is disposed radially inwardly of said rollers.

13. The assembly of claim 10, and wherein a bar of each of said separator and retainer is disposed between each two adjacent clutching rollers.

14. The assembly of claim 10 and wherein said retainer bars and said separator bars are alternately disposed in spaces between adjacent rollers.

15. The assembly of claim 9, wherein said retainer bars and said separator bars are alternately disposed in spaces between adjacent rollers and wherein each of said retainer bars includes oppositely directed spring means for urging adjacent rollers in opposite circumferential directions; each in abutting relation with an associated ramp means; adjacent ramp means having ramp surfaces facing each other.

16. The assembly of claim 13, and wherein the ramp surface of each of said ramp means has the same disposition circumferentially about said cylindrical member.

17. The assembly of claim 11, wherein said cylindrical member is a separate outer housing, and including a cylindrical shaft in the combination, the circumferential surface of which is in contacting engagement with each of the rollers.

18. The assembly of claim 17, wherein said housing is of the drawn cup type.

19. The assembly of claim 9 and wherein said cylindrical member is disposed radially inwardly of said rollers and wherein said cylindrical member is mounted for rotation with a shaft, and including an outer housing in the combination, the inner circumferential surface of which is in contacting engagement with each of the rollers.

20. The assembly of claim 10, including means provided at one end of said separator for rotating said separator relative to said ramp means and forcing at least some of said rollers to be moved out of abutting relation with said ramp means against the force of said retainer bar spring portions.

21. The assembly of claim 20, wherein said means comprises at least one tab portion extending longitudinally outwardly of one of said ring portions.

22. In combination, a first cylindrical circumferential member, a second cylindrical circumferential member, clutching rollers disposed between said members, cylindrical retaining means for said rollers and having windows therein each defined by parallel bars to receive one such roller, biasing means carried by and projecting from each bar for engagement with one said roller, clutching surface means on one of said members, separating means for contacting engagement with the rollers and for forcing the rollers away from said clutching surface means against the force of said biasing means upon a predetermined rotatable displacement of said separating means.

23. The combination of claim 22, wherein said members are relatively rotatable, one of said members being a driving member and the other of said members being a driven member and means are provided for preventing an overrunning of said driven member with respect to said driving member.

24. The combination of claim 23, wherein said last-mentioned means comprises other clutching rollers associated with other clutching surface means.

25. The combination of claim 24, wherein other biasing means are provided for engagement with said other clutching rollers and for exerting a force against said other clutching elements in the direction of said other clutching surface means.

26. The combination of claim 25, wherein control means are provided for actuating said separating means externally of at least one of said circumferential members.

27. The combination of claim 26, wherein said control means comprises a tab extension of said separating means disposed at an end of said separating means.

References Cited

UNITED STATES PATENTS

| | | | |
|---|---|---|---|
| 2,681,718 | 6/1954 | Stoner | 192—47 XR |
| 2,832,450 | 4/1958 | Wade | 192—45.1 |
| 2,912,086 | 11/1959 | Troendly et al. | 192—45.1 |
| 3,194,369 | 7/1965 | Witte | 192—36 XR |
| 3,260,333 | 7/1966 | Benson et al. | 192—45 |
| 2,990,043 | 6/1961 | Fink | 192—27 |
| 3,034,621 | 5/1962 | Thompson | 192—27 |
| 3,300,002 | 1/1967 | Roper | 192—38 XR |

BENJAMIN W. WYCHE III, Primary Examiner

U.S. Cl. X.R.

192—12, 38, 44, 48.3